(12) United States Patent
Joshi

(10) Patent No.: US 11,885,370 B1
(45) Date of Patent: Jan. 30, 2024

(54) RAPID COUPLING APPARATUS

(71) Applicant: Shailendra Joshi, Ho Ho Kus, NJ (US)

(72) Inventor: Shailendra Joshi, Ho Ho Kus, NJ (US)

( * ) Notice: Subject to any disclaimer, the term of this patent is extended or adjusted under 35 U.S.C. 154(b) by 239 days.

(21) Appl. No.: 17/578,673

(22) Filed: Jan. 19, 2022

(51) Int. Cl.
 *F16B 7/04* (2006.01)
(52) U.S. Cl.
 CPC ................... *F16B 7/048* (2013.01)
(58) Field of Classification Search
 CPC ........................................... F16B 7/048
 See application file for complete search history.

(56) References Cited

U.S. PATENT DOCUMENTS

| | | | | |
|---|---|---|---|---|
| 4,728,064 A * | 3/1988 | Caveney | ............ | B65D 63/1081 248/74.3 |
| 5,803,413 A * | 9/1998 | Benoit | ................. | F16L 3/2334 248/74.3 |
| 5,926,921 A * | 7/1999 | Benoit | ............... | B65D 63/1072 24/17 AP |
| 7,437,804 B1 * | 10/2008 | Geiger | .................... | F16L 3/237 248/74.3 |
| 2013/0298353 A1 * | 11/2013 | Drane | ................ | B65D 63/1027 24/16 PB |
| 2014/0182086 A1 * | 7/2014 | Dorsey | .................... | H02G 3/32 29/428 |
| 2014/0304951 A1 * | 10/2014 | Dodd | ...................... | H02G 3/26 24/136 B |

\* cited by examiner

*Primary Examiner* — David M Upchurch
(74) *Attorney, Agent, or Firm* — Gulf Coast Intellectual Property Group

(57) ABSTRACT

A coupling apparatus configured to provide a quick and efficient technique to operably connect bamboo poles or similar structural members. The present invention includes a first portion and a second portion that are operably integrated to provide coupling of structural members. The first portion includes a first section and a second section wherein the first section is insertable into the second section and is configured to be releasably secured therein. The first section includes grooves that are configured to operable coupled with a locking member located in the second section. Within the scope of the present invention alternate embodiments of the grooves and first section are contemplated. The second portion includes two embodiments wherein the two embodiments are configured to provide alternate orientations of coupling of bamboo poles. The second portion is configured to provide both an end-to-end connection as well as an angular orientation of bamboo poles.

20 Claims, 5 Drawing Sheets

RAPID COUPLING APPARATUS

FIELD OF THE INVENTION

The present invention relates generally to coupling devices, more specifically but not by way of limitation, a coupling apparatus that includes a first portion wherein the first portion is a band like member and a second portion wherein the second portion is a bracket or brace type structure and wherein the first portion and second portion of the apparatus of the present invention are configured to be operably coupled to secure objects such as but not limited to bamboo poles together.

BACKGROUND

Protective shelters are employed in various areas of the world for reasons such as but not limited to post disaster management. Applications of temporary shelters include use of tents or tent-like structures that are often assembled in order to provide temporary shelter for individuals in need. These shelters are installed by humanitarian organizations and require skilled labor and tools in order to execute the desired installation. Once installed, the expectation for duration of the integrity of the temporary shelter is about six months to three years. Existing structures utilize non-native materials such as but not limited to metal or wood poles as part of the support members. These types of materials must be transported into the area in which the shelters are being installed. One issue with utilization of non-native materials is the re-purposing of the materials ensuing the de-installation of the temporary shelter.

Once a shelter has been de-installed, the application specific materials are often discarded and not re-purposed. Many of the areas in which temporary shelters are employed often have sustainable natural elements that could be utilized for construction of the temporary shelters. By way of example but not limitation, bamboo is a plentiful natural material that is often found in environments where temporary shelters are deployed. Third world countries such as but not limited to Haiti have large installations of temporary shelters and have an indigenous supply of suitable materials such as bamboo. Bamboo has intrinsic characteristics such as but not limited to high tensile strength and flexibility which make it a suitable material for utilization as support members in a tent-like structure. The one issue with bamboo is that penetration of the cell structure results in water damage and comprises the structural integrity of the bamboo pole.

Accordingly, there is a need for a coupling apparatus that is configured to operably couple structural members such as but not limited to bamboo wherein the apparatus facilitates the coupling of the members without mechanical penetration into the member so as to preserve the structural integrity thereof.

SUMMARY OF THE INVENTION

It is the object of the present invention to provide a coupling apparatus that is configured to operably connect at least two structural members wherein the apparatus of the present invention includes a first portion and a second portion that are employed to structurally couple two independent members.

Another object of the present invention is to provide a rapid coupling apparatus that is configured to promote efficient coupling of two structural members to construct a temporary shelter or similar structure wherein the first portion of the present invention includes a band member integrally formed with a locking portion.

A further object of the present invention is to provide a coupling apparatus that is configured to operably connect at least two structural members wherein the locking portion is operably engaged in a first technique and a second technique to secure or release the band member.

Yet a further object of the present invention is to provide a rapid coupling apparatus that is configured to promote efficient coupling of two structural members to construct a temporary shelter or similar structure wherein the second portion is structure to surroundably mount a portion of the two members being operably coupled by the apparatus of the present invention.

Still another object of the present invention is to provide a coupling apparatus that is configured to operably connect at least two structural members wherein the second portion is provided in alternative embodiments.

An additional object of the present invention is to provide a rapid coupling apparatus that is configured to promote efficient coupling of two structural members to construct a temporary shelter or similar structure wherein the band member further includes a plurality of gripping members on a first surface thereof.

Yet a further object of the present invention is to provide a coupling apparatus that is configured to operably connect at least two structural members wherein the second surface of the band member includes a plurality of locking engagement members.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
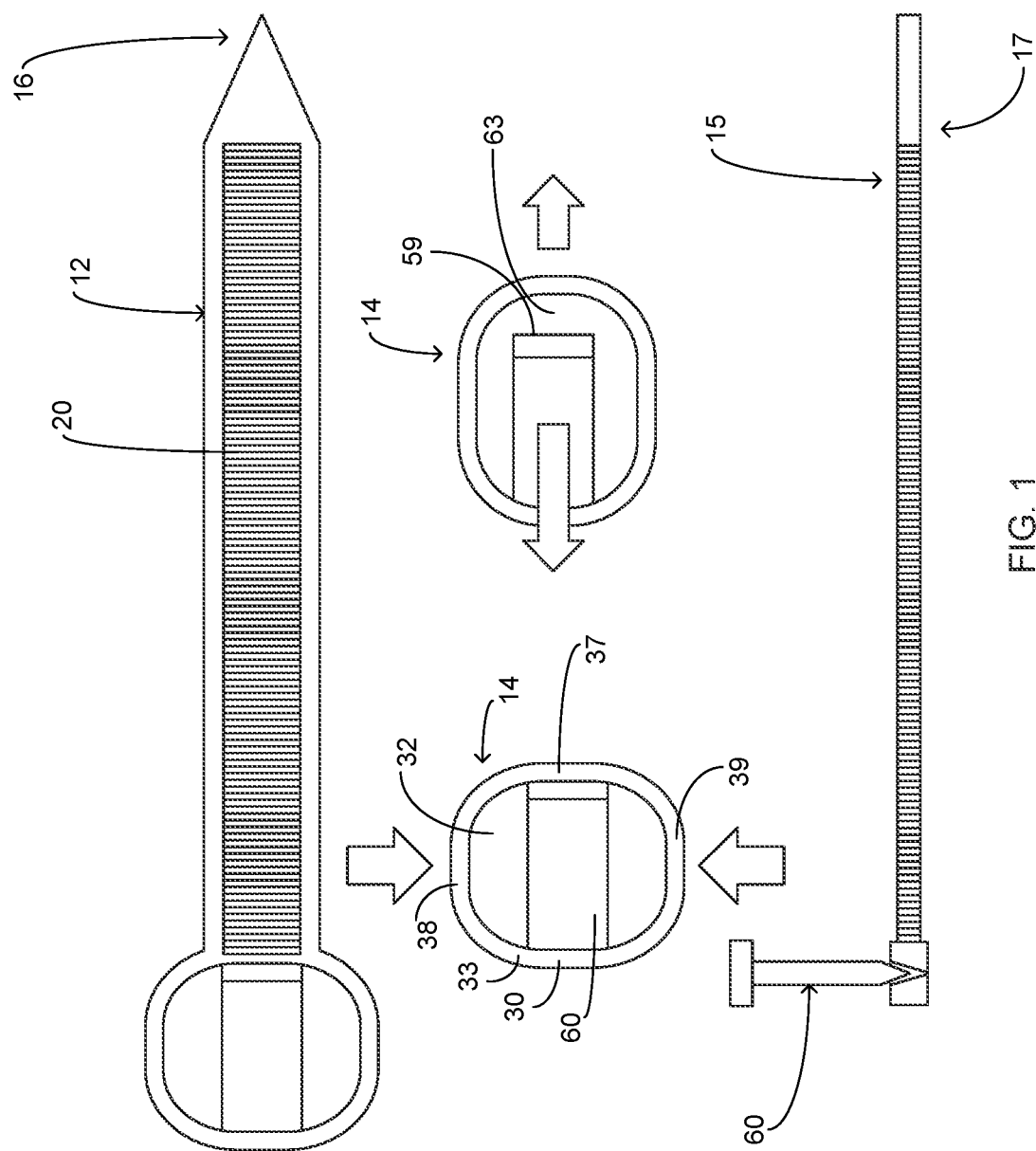
FIG. 1 is a detailed view of the first portion of the present invention.

Referring now to the drawings submitted herewith, wherein various elements depicted therein are not necessarily drawn to scale and wherein through the views and figures like elements are referenced with identical reference numerals, there is illustrated a coupling apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the coupling apparatus 100 includes a first portion 10 and a second portion 50. The first portion 10 and second portion 50 are configured to cooperatively bind elements such as but not limited to bamboo poles 99,98. Both the second portion 50 and the first portion 10 have alternative embodiments that are discussed further herein. The coupling apparatus 100 provides a technique to rapidly secure support members together such as but not limited to bamboo poles for the purpose of providing a support structure for tents or tent-like structures. It should be understood within the scope of the present invention that alternate uses of the coupling apparatus 100 could be employed and the design thereof is to facilitate use without need of specialized training or tools.

The first portion 10 includes a first section 12 and a second section 14 that are integrally formed and is manufactured from a suitable material such as but not limited to plastic. The first section 12 is planar in manner having a first side 15 and a second side 17. The first section 12 includes end 16 wherein end 16 in a preferred embodiment is tapered in shape so as to promote easier insertion into the second section 14. It is contemplated within the scope of the present invention that the first section 12 could be provided in alternate lengths and widths. Furthermore, it should be understood within the scope of the present invention that the first portion 10 could be provided in alternate sizes wherein the sizes provide alternate load capacities. The first section 12 includes a plurality of grooves 20 formed on the surface of the first side 15. The grooves 20 extend substantially the length of the first section 12 and are configured to releasably secured the end 59 of the locking member 60 therein. The locking member 60 in its second position has a biased force thereon that provides a frictional and pressure engagement with the first section 12 and the grooves 20 function to provide stability of the position of the locking member 60 with the first section 12 and further inhibit movement thereof ensuing the locking member 60 being placed in its second position.

Figure 3:
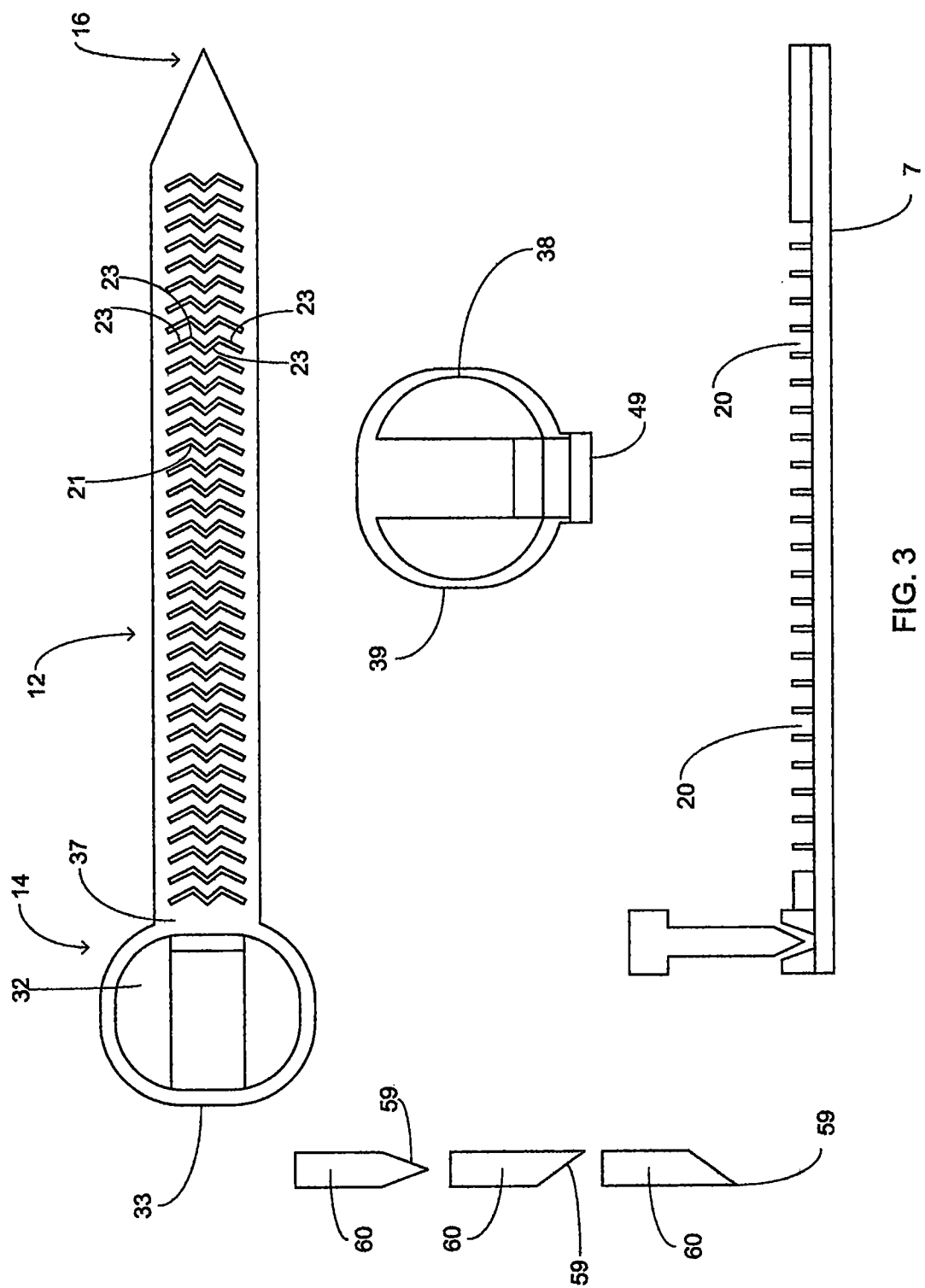
FIG. 3 is a detailed view of an alternative embodiment of the first portion of the present invention.

The first section 12 includes an alternative embodiment of the grooves 21 illustrated herein in FIG. 3. Grooves 21 comprise four contiguous sections 23 that are angular in configuration in contrast to the linear grooves 20. The angular orientation of grooves 21 provide a distribution of force in two separate directions. The force distribution in two separate directions on opposing halves of the contiguous sections 23 allows for a greater load capacity. In this embodiment the end 59, would be mateably shaped so as to operably engage the grooves 21. It should be understood within the scope of the present invention that the grooves 20,21 could be provided in alternate shapes in order to influence load capacities and operably engage with end 59 of the locking member 60.

The second section 14 of the first portion 10 includes wall member 30. Wall member 30 is manufactured from a resilient material that allows the second section to be engaged by a user and moved from a first position to a second position. By way of example but not limitation, the wall member 30 could be manufactured from plastic. The wall member 30 defines opening 32 wherein the opening 32 is of suitable size to accommodate locking member 60. Locking member 60 is integrally formed with section 33 of wall member 30. The locking member 60 includes end 59 that is integrally formed with section 33 of the wall member 30 utilizing suitable techniques such as but not limited to injection molding. The locking member 60 is planar in manner and extends to section 37 of wall member 30. The locking member 60 is moved intermediate its first position and second position with pressure engagement on wall section 38, 39 which elongates the second section 14 so as to create a void 63 between end 59 and allow the first section 12 to be journaled therethrough. Ensuing release of pressure from sections 38,39, the second section 14 will return to its original unbiased shape and as such the locking member 60 will be operably engaged with the first section 12, more specifically end 59 will be coupled with grooves 20 or 21 depending on the embodiment being utilized. The first position of the wall member 30 provides sufficient force to maintain the engagement of the locking member 60 and the grooves 20.

Figure 2:
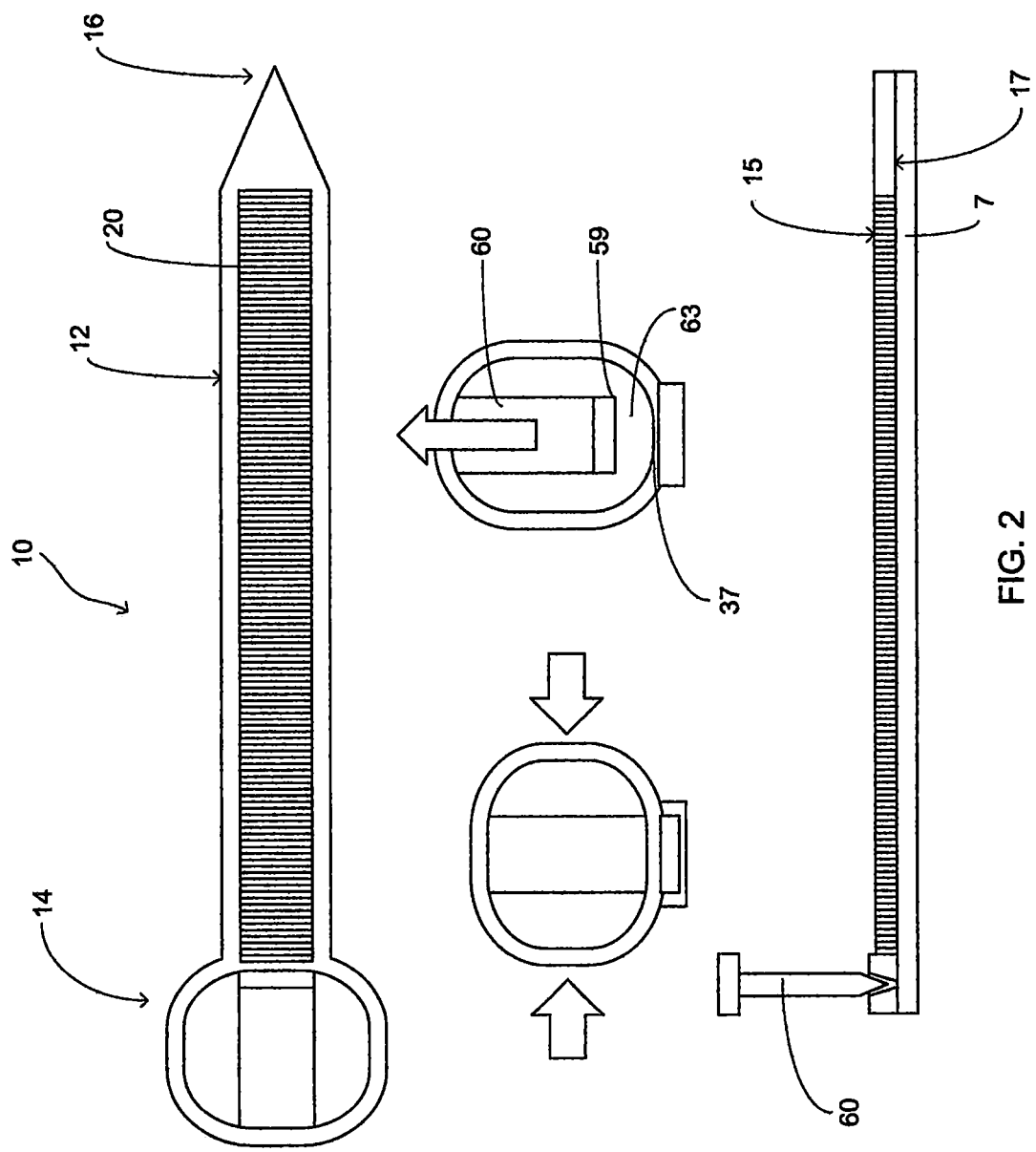
FIG. 2 is a detailed view of an alternate first portion of the present invention.

The coupling apparatus 100 includes alternative embodiments for the second side 17 of the first section 12 of the first portion 10. In use, the second side 17 will be adjacent and engaging a portion of either the bamboo pole and/or a surface of the second portion 50. As illustrated herein in FIG. 1, the second side 17 has no additional elements and includes an outer surface of exposed material of which the first portion 12 is manufactured. Illustrated herein in FIGS. 2 and 3, the first portion 12 includes a gripping element 7 secured to the second side 17. The gripping element 7 is secured to the second side 17 utilizing suitable durable techniques and is operable to provide a first and second benefit. The gripping element 7 is manufactured from rubber or similar material and as such will provide improved friction with either the section of the second portion 50 of the coupling apparatus 100 or an improved friction with the bamboo poles 98,99. The material of the gripping element 7 provides improved slip resistance over the plastic from which the preferred embodiment of the first portion 10 is manufactured. In one embodiment, the gripping element 7 extends the length of the first section 12. The gripping element 7 can also be configured so as to have an upper surface thereof exposed so as the edge 59 of the locking member 60 will engage therewith. This provides a surface and material that allows edge 59 to more deeply engage and as such enhance the strength of the connection. It should be understood within the scope of the present invention that the lower gripping element 7 could be provided wherein the upper surface is exposed or wherein the gripping element 7 is secured to the second side 17 and not have an upper surface exposed into the grooves 20,21.

Figure 4:
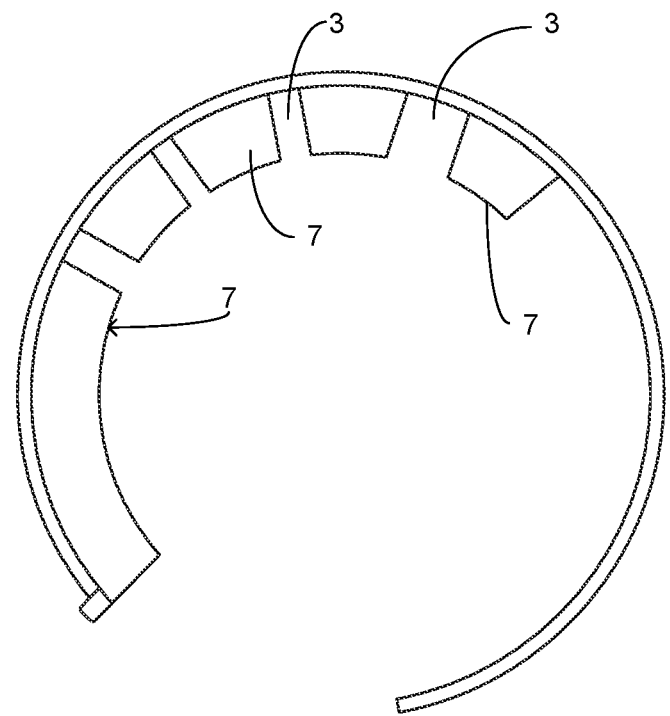
FIG. 4 is a detailed view of the first portion of the present invention having gripping members formed thereon.

The gripping element 7 further includes an additional embodiment as illustrated herein in FIG. 4. In this embodiment, the gripping element 7 is divided into segments and is configured to extend outward from the second side 17. The segments have a void 3 therebetween so as to facilitate the ability for the first section 12 to be surroundably secured a desired object. As the segments are thick, the voids 3 allow the first section 12 to be more easily placed in an annular orientation. The segments are manufactured from rubber or similar material that will provide a desired frictional engagement with the objects to which the first section 12 is being surroundably mounted. It should be understood within the scope of the present invention that the gripping element 7 could be provided such that various quantities of segments could be employed in that embodiment of the gripping element 7.

The second section 14 can also be configured with a gripping element 49. The gripping member 49 is manufactured from a similar material such as but not limited to rubber. Gripping member 49 is configured to provide a material with which the locking member 60, specifically the edge 59 thereof, can more deeply penetrate so as to provide a more secure connection. As illustrated herein in FIG. 3, the edge 59 of the locking member 60 can be formed in alternate shapes. The shape of the edge 59 along with the material of the gripping member 49 provides a technique to improve the engagement and overall load capacity of the coupling apparatus 100. The three shapes of the edge 59 illustrated herein in FIG. 3 are exemplary and it should be understood that alternate edge shapes could be employed. The three shapes of the edge 59 are further operable to provide additional functionality wherein the alternate shapes provide functionality towards release or locking.

Figure 5:
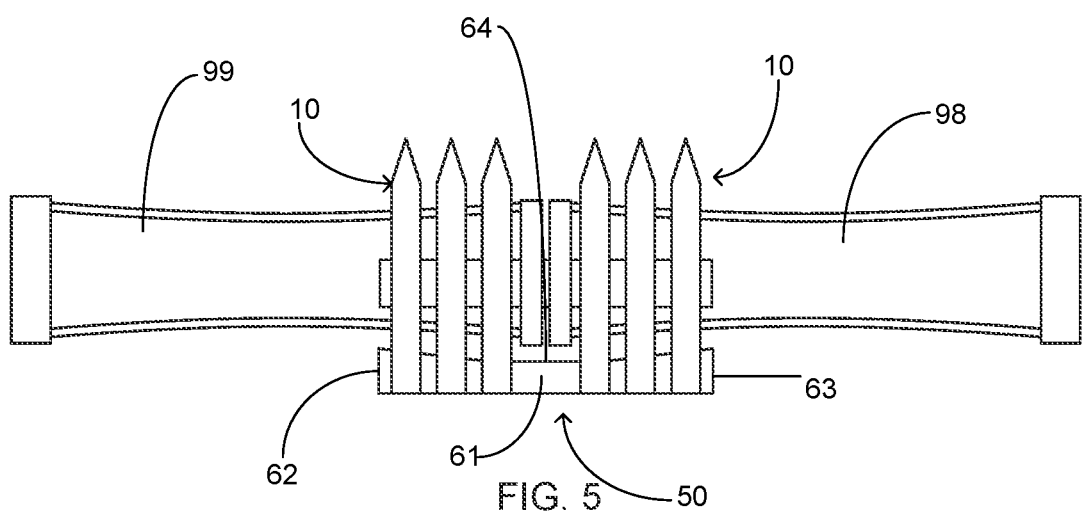
FIG. 5 is an exemplary view of the present invention coupling two bamboo poles.
Figure 6:
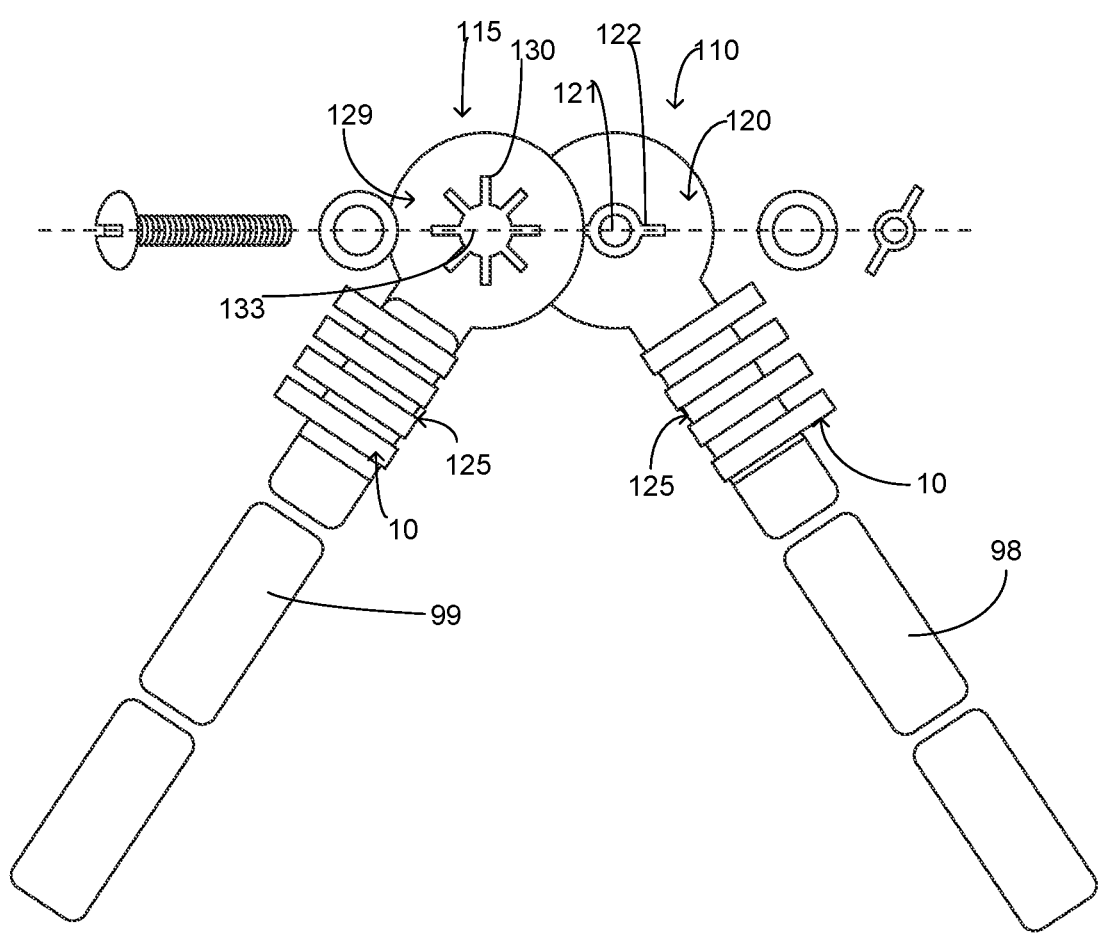
FIG. 6 is a perspective view of the second portion of the present invention.

The embodiments of the second portion 50 of the coupling apparatus 100 are illustrated in FIGS. 5 and 6 herein. The objective of the second portion 50 is to operably couple the bamboo poles 98,99 without penetration thereinto so as to avoid damage to the bamboo poles 98,99 and preserve the structural integrity thereof. In the embodiment of the second portion 50 illustrated in FIG. 5, the second portion 50 includes a body 61 wherein the body 61 is elongated in manner having a first end 62 and second end 63. The body 61 includes an upper surface 64 wherein the upper surface 64 is slightly concave in shape. The upper surface 64 is manufactured from a durable nonslip material such as but not limited to rubber. The second portion 50 has operably coupled thereto a plurality of first portions 10 that have been previously described herein and are operable to fasten the second portion 50 to the bamboo poles 98,99. When fastened, via tightening of the first portions 10 as described herein, the upper surface 64 will compress against the bamboo poles 98,99 so as to ensure coupling of the bamboo poles 98,99. The embodiment of the second portion 50 illustrated in FIG. 5 is configured to facilitate and end-to-end coupling of bamboo poles 98,99.

Referring in particular to FIG. 6 herein, an alternative embodiment of the second portion 50 is illustrated herein. The embodiment of the second portion 50 illustrated in FIG. 6 includes a first segment 110 and a second segment 115. The first segment 110 and second segment 115 are similarly constructed from a durable material such as but not limited to metal. The first segment 110 and second segment 115 each include an upper portion 120 integrally formed with a lower portion 125. The lower portion 125 is tube shaped having a hollow passage in a portion thereof so as to facilitate the bamboo poles 98,99 being journaled thereinto. The lower portion 125 further includes a plurality of the first portions 10 of the coupling apparatus 100 operably coupled therewith so as to facilitate the securing of the lower portion 125 to the bamboo poles 98,99. The upper portion 120 of the first segment 110 is disc shaped and includes center aperture 121. Further included are protrusions 122 that are proximate the center aperture 121 being diametrically opposed and extend outward from the center aperture 121. The protrusions 122 are linear in manner so as to engage with perimeter slots 130 as is further discussed herein.

The second segment 115 includes an upper portion 129 wherein the upper portion 129 is disc shaped and of similar size to the upper portion 120. The upper portion 129 includes center aperture 133 wherein the center aperture 133 includes a plurality of perimeter slots 130. The perimeter slots 130 are radially distributed around the center aperture 133 and are configured to operably couple with protrusions 122. The arrangement of the perimeter slots 130 facilitates the ability to operably coupled the bamboo poles 98,99 at various angles. This embodiment of the second portion 50 can be utilized for making connections between bamboo poles 98,99 other than end-to-end.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A coupling apparatus configured to operably bind a first structural member and a second structural member wherein the coupling apparatus comprises:

a first portion, said first portion having a first section and a second section, said first section and said second section of said first portion being integrally formed, said first section being planar in manner having a first side and a second side, said second section configured to be operably coupled with a said first section ensuing said first section being circumferentially disposed around the first structural member or the second structural member, said first section being releasably secured within said second section;

a second portion, said second portion configured to operably couple with said first portion, said second portion having a first embodiment and a second embodiment, said first embodiment configured to operably couple the first structural member and the second structural member in a first orientation, said second embodiment configured to operably couple the first structural member and the second structural member in a second orientation; and wherein the first embodiment of the second portion being configured to operably couple the first structural member and the second structural member in a linear orientation.

2. The coupling apparatus configured to operably bind a first structural member and a second structural member as recited in claim 1, wherein said second section of said first portion includes a wall member, said wall member defining an opening, said wall member being movable between a first position and a second position.

3. The coupling apparatus configured to operably bind a first structural member and a second structural member as recited in claim 2, and further including a locking member, said locking member being secured to an inner surface of said wall member and is disposed within the opening of said second section of said first portion.

4. The coupling apparatus configured to operably bind a first structural member and a second structural member as recited in claim 3, wherein said first section of said first portion further includes a plurality of grooves formed on said first side of said first section of said first portion, said plurality of grooves having a first embodiment and a second embodiment.

5. The coupling apparatus configured to operably bind a first structural member and a second structural member as recited in claim 4, wherein said first embodiment of said second portion includes a body, said body having a first end and a second end, said body having an upper surface, said upper surface configured to be placed adjacent ends of the first structural member and the second structural member.

6. The coupling apparatus configured to operably bind a first structural member and a second structural member as recited in claim 5, wherein said upper surface of said body of said first embodiment of said second portion is concave in shape.

7. The coupling apparatus configured to operably bind a first structural member and a second structural member as recited in claim 6, wherein said first embodiment of said second portion further has operably coupled thereto a plurality of first portions of the coupling apparatus wherein the first portions are circumferentially disposed around said body and the first structural member and the second structural member.

8. The coupling apparatus configured to operably bind a first structural member and a second structural member as recited in claim 7, wherein said body of the first embodiment of the second portion further includes a rubber lining on the upper surface thereof.

9. The coupling apparatus configured to operably bind a first structural member and a second structural member as recited in claim 8, wherein the first embodiment of the plurality of grooves said grooves are linear in formation.

10. The coupling apparatus configured to operably bind a first structural member and a second structural member as recited in claim 8, wherein the second embodiment of the plurality of grooves said grooves are angular in orientation having four contiguous sections.

11. A coupling apparatus configured to operably bind a first bamboo pole and a second bamboo pole wherein the coupling apparatus comprises:

a first portion, said first portion having a first section and a second section, said first section and said second section of said first portion being integrally formed, said first section being planar in manner having a first side and a second side, said second section configured to be operably coupled with a said first section ensuing said first section being circumferentially disposed around the first bamboo pole or the second bamboo pole, said first section being releasably secured within said second section, said section having a wall member, said wall member being generally ring shaped having an opening within said wall member, said second section of said first portion having a locking member, said locking member being mounted within said opening of said second section of said first portion, said second section having a first position and a second position, in said first position a leading edge of said locking member is biased against an inner surface of said wall member, in said second position of said second section said locking member is removed from said inner surface so as to create a void between said leading edge and said inner surface so as to allow a portion of said first section to be placed therein;

a second portion, said second portion configured to operably couple with said first portion, said second portion having a first embodiment and a second embodiment, said first embodiment configured to operably couple the first bamboo pole and the second bamboo pole in a first orientation, said second embodiment configured to operably couple the first bamboo pole and the second bamboo pole in a second orientation; and wherein the second embodiment of the second portion is configured to operably couple the first bamboo pole and the second bamboo pole in an angular orientation.

12. The coupling apparatus configured to operably bind a first bamboo pole and a second bamboo pole as recited in claim 11, said second embodiment of the second portion of the coupling apparatus having a first segment and a second segment constructed identically being configured to be operably coupled, wherein the second embodiment of the first segment of the second portion of the coupling apparatus includes an upper portion and a lower portion, said upper portion and said lower portion of said first segment of said second embodiment of the second portion of the coupling apparatus being integrally formed, said lower portion of the second embodiment of the second portion being tubular in shape having a hollow portion so as to have an end of the first bamboo pole or an end of the second bamboo pole inserted thereinto.

13. The coupling apparatus configured to operably bind a first bamboo pole and a second bamboo pole as recited in claim 12, wherein the upper portion of the first segment of the second embodiment of the second portion of the coupling apparatus has a disc shaped body, said upper portion of the second embodiment of the second portion of the coupling apparatus further having a center aperture.

14. The coupling apparatus configured to operably bind a first bamboo pole and a second bamboo pole as recited in claim 13, wherein the upper portion of the first segment of the second embodiment of the second portion of the coupling apparatus further includes linear protrusions extending outward from the center aperture and being raised in height from a surface of the disc shaped body.

15. The coupling apparatus configured to operably bind a first bamboo pole and a second bamboo pole as recited in claim 14, wherein the upper portion of the second segment of the second embodiment of the second portion of the coupling apparatus further includes a central aperture and further includes slots radially distributed outward therefrom into a disc shaped body.

16. The coupling apparatus configured to operably bind a first bamboo pole and a second bamboo pole as recited in claim 15, wherein said first section of said first portion of the coupling apparatus further includes at least one gripping member, said at least one gripping member being disposed on said second side of said first section of said first portion of the coupling apparatus.

17. The coupling apparatus configured to operably bind a first bamboo pole and a second bamboo pole as recited in claim 16, wherein said first section of said first portion further includes a plurality of grooves formed on said first side of said first section of said first portion, said plurality of grooves having a first embodiment and a second embodiment.

18. The coupling apparatus configured to operably bind a first bamboo pole and a second bamboo pole as recited in claim 17, wherein said second embodiment of said plurality of grooves said plurality of grooves have four contiguous section being angular in configuration to produce a first angle and a second angle of force distribution for the locking member engaged therewith.

19. The coupling apparatus configured to operably bind a first bamboo pole and a second bamboo pole as recited in claim 18, wherein in said first embodiment of the plurality of grooves the plurality of grooves are parallel in configuration having a space therebetween configured to receive the leading edge of said locking member.

20. The coupling apparatus configured to operably bind a first bamboo pole and a second bamboo pole as recited in claim 19, wherein the second section of the first portion of the coupling apparatus is moved to said second position via inward pressure on opposing sections of the wall member.

* * * * *